United States Patent
Murata

[11] Patent Number: 5,847,859
[45] Date of Patent: Dec. 8, 1998

[54] OPTICAL READING DEVICE

[75] Inventor: Hisashi Murata, Miyagi-ken, Japan

[73] Assignee: Alps Electric Co., Ltd., Japan

[21] Appl. No.: 618,480

[22] Filed: Mar. 19, 1996

[30] Foreign Application Priority Data

Mar. 31, 1995 [JP] Japan ..................................... 7-075885

[51] Int. Cl.⁶ .................................................. G02B 26/08
[52] U.S. Cl. .......................... 359/201; 359/196; 359/223; 359/291; 359/298; 359/849; 359/853; 359/865; 235/467; 235/470
[58] Field of Search .................................... 359/196, 201, 359/223, 224, 225, 226, 290, 291, 295, 298, 315, 318, 849, 850, 851, 853, 865, 872; 235/467, 470, 472; 250/234, 235

[56] References Cited

U.S. PATENT DOCUMENTS

| | | | |
|---|---|---|---|
| 5,285,407 | 2/1994 | Gale et al. ............................... | 365/189 |
| 5,387,924 | 2/1995 | Gale, Jr. et al. ......................... | 345/108 |
| 5,475,208 | 12/1995 | Marom .................................... | 235/467 |
| 5,629,790 | 5/1997 | Neukermans et al. .................. | 359/201 |
| 5,635,708 | 6/1997 | Obata ...................................... | 359/201 |

FOREIGN PATENT DOCUMENTS 6-124360  5/1994  Japan.

*Primary Examiner*—Cassandra C. Spyrou
*Assistant Examiner*—Darren E. Schuberg
*Attorney, Agent, or Firm*—Brinks Hofer Gilson & Lione

[57] ABSTRACT

A small-sized optical reading device for performing the high-speed optical scanning of an object to be read, and for returning light irregularly reflected by the object. In this device, a first reflector element is driven in such a manner as to perform reciprocative rotations or vibrations clockwise and counterclockwise. Further, a medium, on which a bar code, namely, the object is recorded, is scanned by light beams reflected by the first reflector element. The light beams irregularly reflected by the medium are returned to a reflector element array consisting of second reflector elements of a reciprocative vibration reflector. Independent drive signals are provided concurrently to the first reflector element and the reflector element array. The reflecting surface of the first reflector element has a size sufficient to the extent that the entire spotlight caused by a semiconductor laser can be reflected. The reflector elements, which have widths sufficient to the extent that the light beams irregularly reflected by the medium can be further reflected by the reflector elements, are arranged in a scanning direction.

5 Claims, 10 Drawing Sheets

OPTICAL READING DEVICE

BACKGROUND OF THE INVENTION

1. Field of the Invention

The present invention relates to an optical reading device for optically scanning an object to be read and for returning light reflected irregularly by the object. More particularly, the present invention relates to an optical reading device suitable for reading, for example, a bar code.

2. Description of the Related Art

Conventional bar-code readers are described in, for instance, Japanese Patent Public Disclosure Nos. 58-132865/1983, 64-15888/1989, 64-48184/1989, 2-67453/1990 and 2-133891/1990 Official Gazettes. Further, as a conventional optical deflector, there has been known a device, in which a plurality of micro-reflector-plates are placed and are simultaneously aimed or trained in a same direction, respectively, to thereby deflect all light beams as described in, for instance, Japanese Patent Public Disclosure No. 4-338913/1992.

FIG. 13 illustrates an example of the conventional bar-code reader (or scanner) of the galvanomirror type. First, light beams L1 outputted or emitted from a semiconductor laser 1 are collected or condensed by a lens 2, so that a small-diameter spot (or spotlight) is generated. This spotlight passes through an apertured concave mirror 3 and is then reflected by a galvanomirror 4. The galvanomirror 4 is driven in such a manner as to make clockwise and counter-clockwise reciprocative rotational or pivotal motions (or vibrations) around a spindle 4a. Thus, a medium (or media) 5, on which a bar code to be read (namely, an object to be read (not shown)) is recorded, is scanned in a direction by the light beams L1 reflected by the galvanomirror 4. Subsequently, return (or back) light beams L2 reflected irregularly by the medium 5 are returned to the galvanomirror 4 and are then reflected thereon. Next, the return light beams L2 are further reflected and are collected (or condensed) by the apertured concave mirror 3. Subsequently, the return light beams L2 are further condensed by a lens 6. Thereafter, the return light beams L2 are received by a photodiode 7.

FIG. 14 illustrates an example of the conventional bar-code reader of the polygon mirror type. First, light beams L1 outputted or emitted from a semiconductor laser 1 are condensed by a lens 2, so that a small-diameter spot (or spotlight) is generated. This spotlight passes through an apertured mirror 3a and is then reflected by each of the reflecting surfaces of a polygon mirror 8. The polygon mirror 5 of this example rotates (or pivotally moves) counterclockwise around an axis of rotation thereof. Thus, a medium (or media) 5, on which a bar code is imprinted or recorded, is scanned in a direction by the light beams L1 reflected by each of the reflecting surfaces of the polygon mirror 5. Subsequently, return (or back) light beams L2 reflected irregularly by the medium 5 are returned to each of the reflecting surfaces of the polygon mirror 5 and are then reflected thereon. Next, the specular reflection (namely, the direct or regular reflection) of the return light beams L2 is performed by the apertured mirror 3a. Subsequently, the return light beams L2 are further condensed by a lens 6. Thereafter, the return light beams L2 are received by a photodiode 7.

Meanwhile, the reflecting areas (of the order of square centimeters) of the galvanomirror 4 and the polygon mirror 8 should be large in order to secure a predetermined quantity of light beams which optically scan an object to be read and are irregularly reflected by the object and are then returned therefrom. Thus, in the cases of using the galvanomirror 4 and the polygon mirror 8 therein, vibrations or oscillations thereof occurring at the time of scanning become large and moreover, inertia forces due to the rotations thereof become strong. The conventional devices, therefore, have drawbacks in that naturally, it becomes difficult to achieve the high-speed scanning of a bar code, that the rise time of each of the conventional devices, namely, a time required to activate each of such conventional devices having been in the stopped state thereof becomes longer, that thus, there is a limit of the reading speed of the conventional device of the hand-held type which frequently changes the state thereof between the stopped state and the scanning state, and that the power consumption thereof becomes increased.

Incidentally, in the cases of conventional optical reading devices of the type using a non-returning method in which light reflected by the medium (or media) 5 is not returned therefrom, a large quantity of disturbance light is incident on a light receiving element from a region other than a reading point, so that the signal-to-noise (S/N) ratio of the device is degraded and the reading performance of the device using the non-returning method is lower than that of the device using the returning method.

Hereupon, in Japanese Patent Public Disclosure No. 4-38913/1992 Official Gazette, there has been proposed a method by which a plurality of micro-reflector-plates are placed in the device and the plurality of micro-reflector-plates are simultaneously aimed or trained in a same direction, respectively, to thereby deflect all light beams. Thus, it is thought that this method should be applied to the optical reading device. However, in the case of using this method, all light beams are deflected by the plurality of micro-reflector-plates, namely, all light beams are divided and reflected by the plurality of reflector-plates, so that the light beams are irregularly reflected on the edges of the reflector-plates, respectively, and as a result, an image of a spot cannot be formed (namely, a spotlight cannot be focused to a spot) on an object to be scanned. Moreover, in the case of this method, it is not taken into consideration that light beams irregularly reflected by the object are returned therefrom. Consequently, this method cannot be applied to the device in which the light beams reflected by the mirror having a large reflecting area are returned from the object to be read.

It is, accordingly, a first object of the present invention to provide an optical reading device that can reduce the inertial mass of a drive portion thereof and can condense returned light by a large area of a second reflector element and can scan an object at a high speed and is desirable as a device of the hand-held type.

Further, it is a second object of the present invention to provide an optical reading device which can easily perform the ultra-high-speed scanning of an object to be read and can be activated from the stopped state thereof quickly to such an extent that the rise time thereof is negligible, and which can prevent the reading speed thereof from being reduced even when used as an optical reading device of the hand-held type that frequently repeats stopping and scanning operations with the intention of reducing the power consumption thereof, and which can easily increase the area of the entire reflector by increasing the number of reflector element cells, with the result that the quantity of light obtained by condensing reflected and returned light can be increased and the mechanical vibration thereof becomes negligible and the reliability thereof can be considerably improved, and which becomes easy to use without causing a feeling of vibrating in a hand of a user thereof even when used as an optical reading device of the hand-held type.

Moreover, it is a third object of the present invention to provide an optical reading device that has a simple configuration with ease of fabrication but without utilizing a special optical element (for example, an apertured mirror) and adding optical elements, such as a mirror and a prism, for separating irradiated light (or emitted light) from received light.

Furthermore, it is a fourth object of the present invention to provide an optical reading device that can increase the reflecting area of a second reflector element, whereby the quantity of light, which is obtained by condensing returned light, can be increased.

Additionally, it is a fifth object of the present invention to provide an optical reading device that can decrease the diameter of a lens for condensing light returned from a second reflector element, can be increased and is suitable for being used as an optical reading device of the hand-held type.

Besides, it is a sixth object of the present invention to provide an optical reading device which can simplify a drive system in comparison with those of the conventional devices which use a galvanomirror and a polygon mirror.

SUMMARY OF THE INVENTION

The first object of the present invention is achieved by providing an optical reading device (hereunder sometimes referred to as a first means) which comprises: a light source for irradiating a light beam; a first reflector element, adapted to rotate (or pivotally move) in a reciprocating direction corresponding to a scanning direction, for reflecting the light beam in such a manner that an object to be read is irradiated with the light beam; and a reflector element array consisting of a second reflector element or more, adapted to pivotally move (or rotate) in a reciprocating direction corresponding to the scanning direction, for reflecting return light irregularly reflected by the object. Further, in the first means, the first reflector element and the reflector element array are configured in such a way as to be integral with each other and are placed on an optical axis and independent drive signals are provided concurrently to the first reflector element and the reflector element array.

Further, the second object of the present invention is attained by providing an optical reading device (hereunder sometimes referred to as a second means) which comprises: a light source for irradiating a light beam; a first reflector element cell consisting of a plurality of first reflector elements, adapted to pivotally move (or rotate) in a reciprocating direction corresponding to a scanning direction, for reflecting the light beam in such a manner that an object to be read is irradiated with the light beam; and a reflector element cell array composed of a plurality of second reflector element cells each consisting of a plurality of second reflector elements which are adapted to pivotally move (or rotate) in a reciprocating direction corresponding to the scanning direction, for reflecting return light irregularly reflected by the object.

Moreover, the third object of the present invention is achieved by providing an embodiment (hereunder sometimes referred to as a third means) of the first or second means, in which an angle of reflection of the first reflector element is different from an angle of reflection of the second reflector element.

Furthermore, the fourth object of the present invention is achieved by providing an embodiment (hereunder sometimes referred to as a fourth means) of the first, second or third means, in which a reflecting surface of the first reflector element is not less than a spot diameter (namely, a spot size) corresponding to the light beam and is not more than five times the spot diameter corresponding thereto.

Additionally, the fifth object of the present invention is achieved by providing an embodiment (hereunder sometimes referred to as a fifth means) of the first, second, third or fourth means, in which reference angles of the second reflector elements are sequentially caused to become different (or changed) by a predetermined angle in a scanning direction in such a manner that a total reflecting surface (composed of the reflecting surfaces of the second reflector elements) extending in the scanning direction becomes a nearly concave mirror.

Besides, the sixth object of the present invention is achieved by providing an embodiment (hereunder sometimes referred to as a sixth means) of the first or second means, in which the first and second reflector elements are pivotally moved (or rotated) in a reciprocating direction by a magnet force caused by using an alternating current (AC) power supply.

Further, the sixth object of the present invention is achieved by providing an embodiment (hereunder sometimes referred to as a seventh means) of the first or second means, in which the first and second reflector elements are pivotally moved (or rotated) in the reciprocating direction by Coulomb's force caused by using the AC power supply.

In the case of the first means, a light beam is reflected by a first reflector element which pivotally moves (or rotates) in a reciprocating direction. Further, return light is reflected by a second reflector element or more also pivotally moving in the reciprocating direction. Moreover, the first reflector element and a reflector element array are configured in such a way as to be integral with each other, and are placed on an optical axis (or path), so that the inertial mass of a drive portion can be made to be small. Furthermore, the second reflector element has a large area and thus can condense the return light. Therefore, the first means can scan the object at a high speed. Further, the first means is suitable for being used as an optical reading device of the hand-held type.

In the case of the second means, the structure of a reciprocative vibrating body can be regarded as being effectively fixed. Further, the inertia of the reciprocative vibration of the reflector element becomes negligible. Thus, the ultra-high-speed scanning can be easily achieved. Moreover, the rise time of the device, namely, a time required to activate the device having been in the stopped state thereof can be neglected. Furthermore, the reading speed thereof can be prevented from being reduced even in the case of an optical reading device of the hand-held type that frequently repeats stopping and scanning operations in order to reduce the power consumption thereof. Additionally, the (total) area of all of the reflectors can be easily increased by increasing the number of reflector element cells. Thus, the quantity of light obtained by condensing the returned and reflected light. Moreover, the mechanical vibration thereof becomes negligible. The reliability thereof can be considerably enhanced. Furthermore, the device becomes easy to use without causing a feeling of vibrating in a hand of a user thereof even when used as an optical reading device of the hand-held type.

In the case of the third means, an angle of reflection of the first reflector element is different from an angle of the second reflector element. Thus, there has been caused an angle difference between the optical axes (or paths) of irradiated light and received light. Further, places, at which a light irradiating element and a light receiving element are mounted, are shifted from the optical axes (or paths) of the irradiated light and the received light, respectively. As a result, the utilization of an optical element (for example, an apertured mirror) and the addition of optical elements such as a mirror prism for separating the optical axes (or paths) thereof become unnecessary.

In the case of the fourth means, the reflecting surface of the first reflector element is not less than the spot diameter of the light beam and is not more than five times the spot diameter thereof. Thus, the loss of the light beam can be reduced. Moreover, on the other hand, the reflecting area of the second reflector element can be increased (by restricting the area of the first reflector element). Consequently, the quantity of the condensed return light can be increased.

In the case of the fifth means, reference angles of the second reflector elements are sequentially caused to become different (or changed) by a predetermined angle in a scanning direction in such a manner that a total reflecting surface extending in the scanning direction becomes a nearly concave mirror. Thus, the diameter of a lens for condensing light returned from the second reflector element can be reduced to a small value. Moreover, the fifth means is suitable for being used as an optical reading device of the hand-held type.

In the cases of the sixth and seventh means, the first and second reflector elements are pivotally moved (or rotated) in the reciprocating direction by Coulomb's force caused by using the AC power supply. Thus, the configuration of a drive system can be simplified in comparison with those of the drive systems of the conventional devices which use a galvanomirror and a polygon mirror.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, the preferred embodiments of the present invention will be described in detail by referring to the accompanying drawings.

Figure 1:
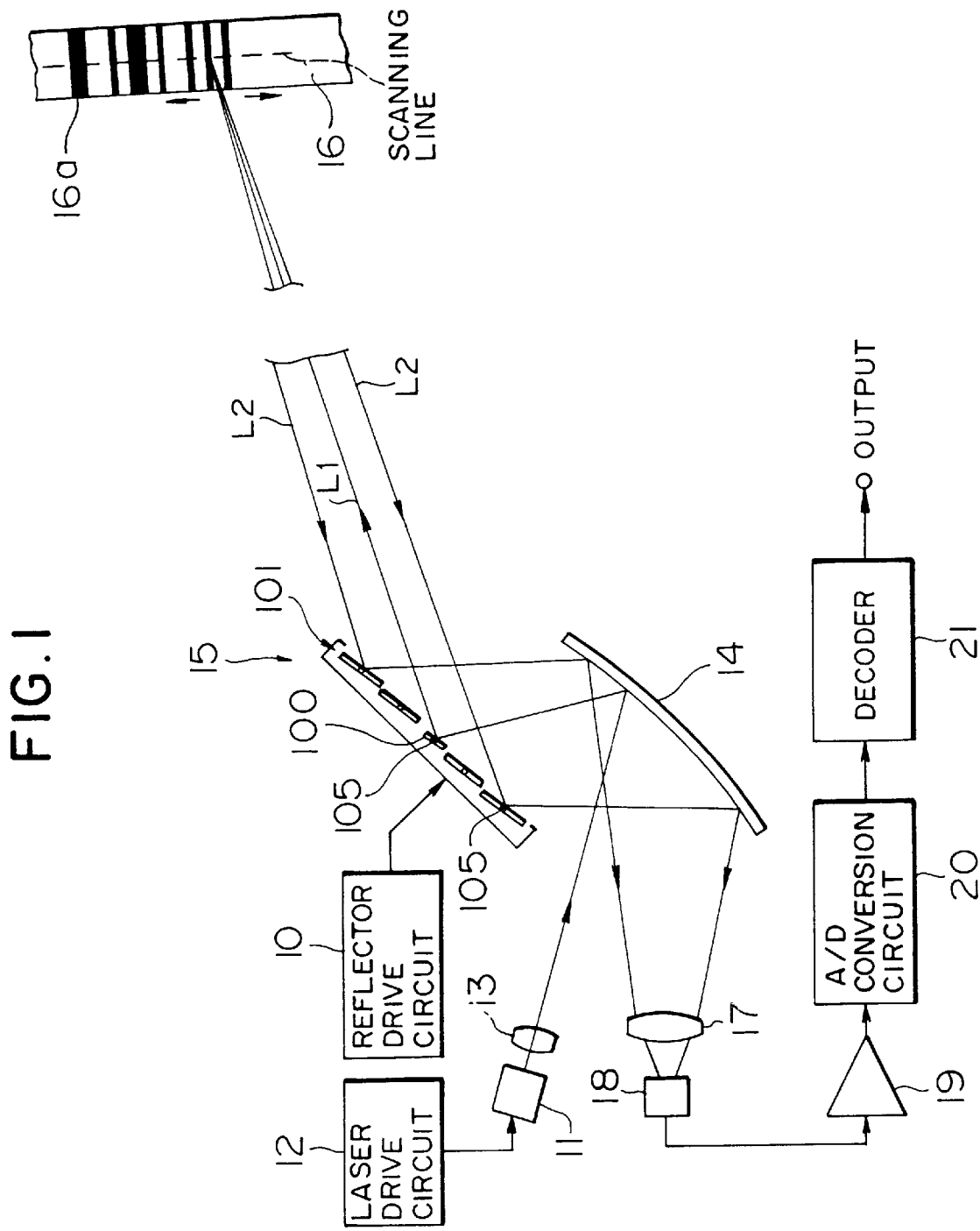
FIG. 1 is a diagram for illustrating the configuration of an optical reading device embodying the present invention, namely, an embodiment of the present invention.
Figure 2:
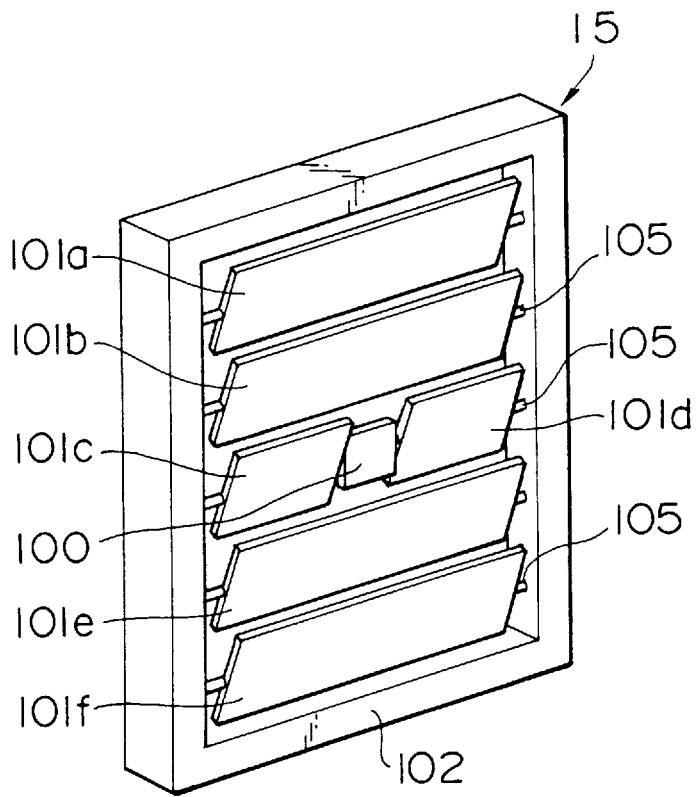
FIG. 2 is an external view of a reciprocative vibration reflector of FIG. 1.
Figure 3:
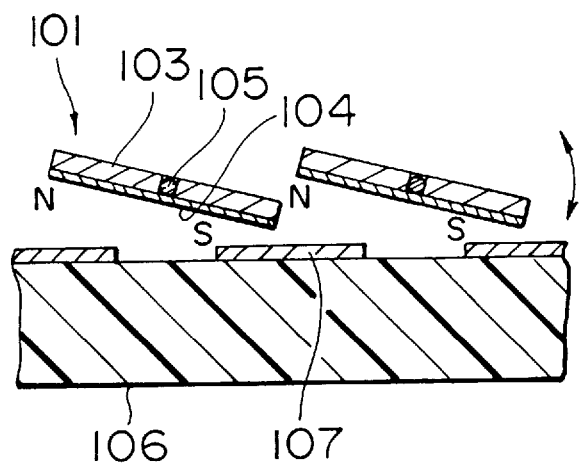
FIG. 3 is a diagram for illustrating the driving principle of the reciprocative vibration reflector of FIG. 2.
Figure 4:
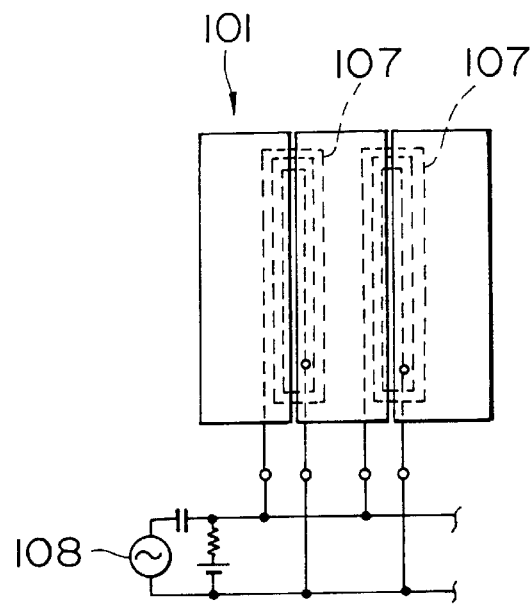
FIG. 4 is a circuit diagram for illustrating a primary part of a reflector drive circuit of FIG. 1.
Figure 5:
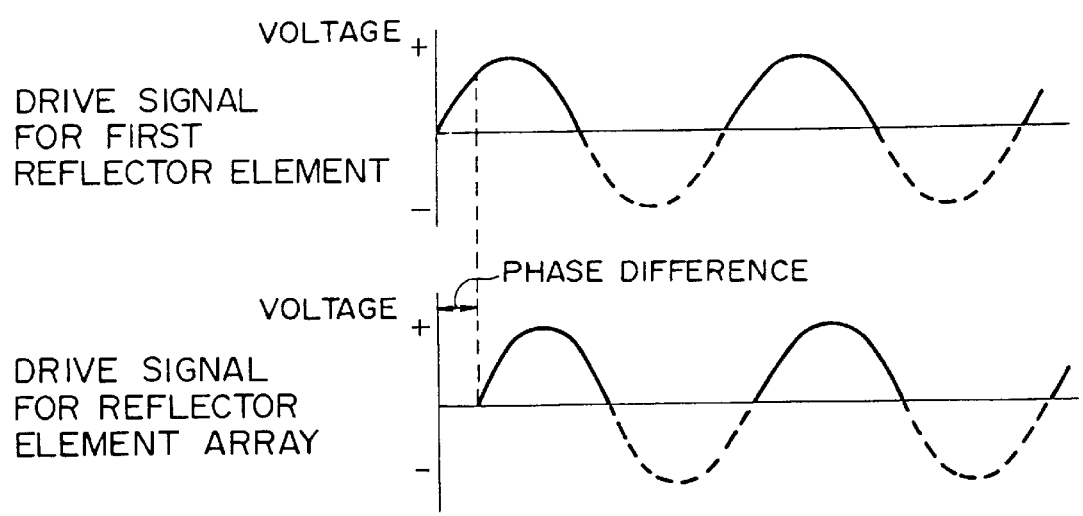
FIG. 5 is a timing chart for illustrating drive signals respectively used for driving a first reflector element and a reflector element array.

FIG. 1 is a diagram for illustrating the configuration of an optical reading device embodying the present invention, namely, a first embodiment of the present invention. FIG. 2 is an external view of a reciprocative vibration reflector of FIG. 1. FIG. 3 is a diagram for illustrating the driving principle of the reciprocative vibration reflector of FIG. 2. FIG. 4 is a circuit diagram for illustrating a primary part of a reflector drive circuit of FIG. 1. FIG. 5 is a timing chart for illustrating drive signals respectively used for driving a first reflector element and a reflector element array.

In FIG. 1, reference numeral 11 designates a semiconductor laser; 12 a laser drive circuit for driving the semiconductor laser 11; 13 a lens for shaping the light beam emitted from the semiconductor laser 11; 14 a concave mirror for reflecting the condensed spotlight having a small spot diameter; 15 a reciprocative vibration reflector; 16a a bar code which is an object to be read; 16 a medium on which the bar code 16a is imprinted or recorded; 17 a collective lens; 18 a photodiode; 19 an amplifier for amplifying a signal obtained by a photoelectric conversion performed by the photodiode 18; 20 an analog-to-digital (A/D) conversion circuit; and 21 a decoder.

The reciprocative vibration reflector 15 consists of a single first reflector element 100 and a reflector element array 101 which is composed of one or more second reflector elements. Incidentally, reference numeral 105 denotes the shaft or axis of vibration of the first reflector element 100 and those of vibration of the second reflector elements.

In this bar code reader, the semiconductor laser 11 is driven by the laser drive circuit 12 and thus outputs a light beam. The shaping of this light beam is performed by the lens 13, so that the spotlight L1 having a small spot diameter is generated. This spotlight L1 is then reflected by the concave mirror 14. Subsequently, this spotlight L1 is further reflected by the single first reflector element 100 of the reciprocative vibration reflector 15. The first reflector element 100 is driven in such a way as to make reciprocative rotational or pivotal motions (or vibrations) clockwise and counterclockwise around the shaft 105 of vibration. Thus, the medium 16, on which the bar code 16a (namely, an object to be read) is imprinted or recorded, is scanned by the light beam (namely, the spotlight) L1 reflected by the first reflector element 100.

Then, return light L2 irregularly reflected by the medium 16 returns to the reflector element array 101 consisting of one or more of the second reflector elements of the reciprocative vibration reflector 15. Moreover, the return light L2 is reflected thereon. Subsequently, the return light L2 is reflected and is further condensed by the concave mirror 14. Next, the light L2 is further condensed by the lens 17. Thereafter, this condensed light is received by the photodiode 18 which performs a photoelectric conversion on the received light. Then, a signal obtained by the photoelectric conversion by the photodiode 18 is amplified by the amplifier 19. Subsequently, this signal is converted by the A/D conversion circuit 20 into a digital value. Next, the bar code 16a is decoded by the decoder 21.

Next, the reciprocative vibration reflector 15 will be described in detail by referring to FIGS. 2 to 5.

In the case of this embodiment, the single first reflector element 100 and the reflector element array 101 consisting of the six second reflector elements 101a to 101f are supported on the shaft 105 of vibration in a casing 102, as illustrated in FIG. 2. Further, the first reflector element 100 is fixed between central reflector elements 101c and 101d of the second reflector element array 101 at an angle different from angles, at which the reflector elements 101c and 101d are respectively fixed, in such a manner that these elements are integral with one another. Thereby, the reflecting surface of the first reflector element 100 is formed in such a way as to have a size sufficient to reflect the entire spotlight L1. Moreover, each of the reflector elements 101a to 101f is formed in such a manner as to have a width enough to reflect the sufficient quantity of the return light L2 irregularly reflected by the medium 16. Furthermore, these reflector elements 101a to 101f are arranged in a scanning direction.

Each of the first reflector elements 100 (and the six second reflector elements 101a to 101f) is constituted by a layered product (namely, a laminate body) having a reflecting surface 103 and a magnetic film 104. Further, each of the elements 100 is supported in such a way as to be able to make clockwise and anti-clockwise reciprocative rotational or pivotal motions (or vibrations) around the shaft 105 of vibration. Moreover, a circuit board 106 is provided in the casing 102. As illustrated in FIG. 4, a thin film coil 107 is formed on this circuit board 106 in such a manner as to face the magnet film 104.

Therefore, the reflector element 100, 101a to 101f are caused by an AC power supply 108 of FIG. 4 to make reciprocative rotational or pivotal motions. Thus, the first reflector element 100 can scan an object with the spotlight L1 in one-dimensional direction. Further, the reflector element array 101 can reflect the return light L2, which has been irregularly reflected by the medium 16, by the large light-condensing-area thereof.

Moreover, the reflecting surface of the first reflector element 100 is not less than a spot diameter of the light beam L1 and is not more than the spot diameter thereof. Thus, the loss of the light beam can be reduced. Moreover, on the other hand, the reflecting areas of the second reflecting elements 101a to 101f can be increased (by restricting the area of the first reflector element 100). Consequently, the quantity of light obtained by condensing the return light can be increased.

Incidentally, in the case of this embodiment, the first reflector element 100 and each of the reflector elements 101c and 101d of the reflector element array 101 are placed by being turned different angles around the shaft 105 of vibration, respectively, in such a manner as to be integral with each other. However, instead of forming the first reflector element 100 and each of the reflector elements 101c and 101d of the reflector element array 101 in such a way as to be integral with each other, each of these reflector elements may be supported in such a manner as to vibrate separately from each other and may be controlled by using drive signals of FIG. 5.

This figure illustrates phases of drive signals respectively used for driving the first reflector element 100 and the reflector element array 101. The drive signals respectively used for driving the first reflector element 100 and the reflector element array 101 have a same frequency. However, there is the phase difference between these drive signals. Moreover, the second reflector elements 101a to 101f of the reflector element array 101 are driven by the drive signals at a same phase thereof.

Therefore, the reflecting angle of the first element 100 is different from that of the reflector element array 101, so that there occurs the angle difference between the optical axes (or paths) of the irradiated light and the received light. Thus, places, at which the light irradiating element and the light receiving element are mounted, are shifted from the optical axes (or paths of) the irradiated light and the received light, respectively. Consequently, an apertured mirror and a mirror prism for separating the optical axes (or paths) thereof become unnecessary.

Next, an example of a modification of the present invention will be described hereinbelow.

Figure 6:
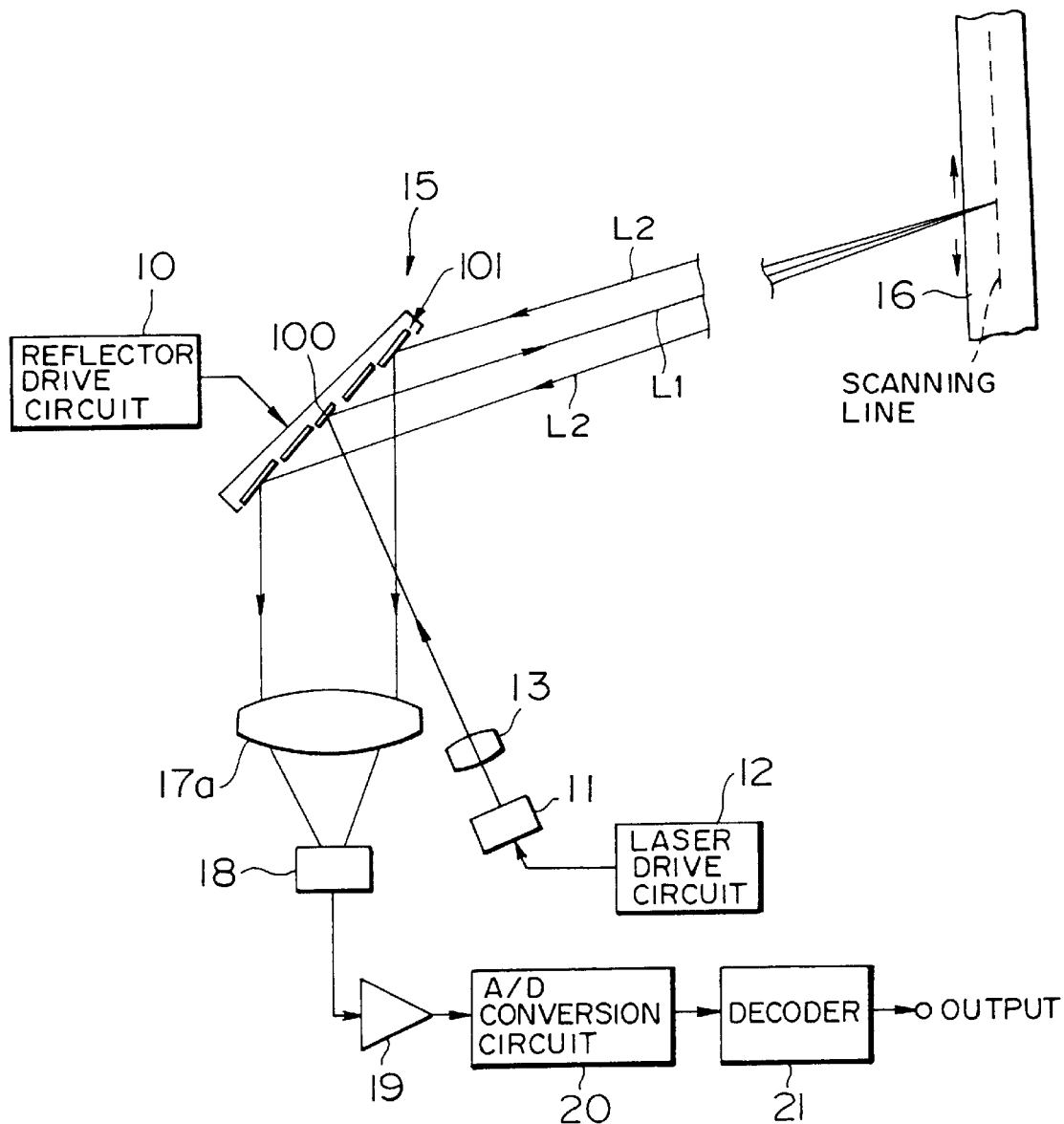
FIG. 6 is a diagram for illustrating the configuration of a modification of the embodiment of FIG. 1.
Figure 14:
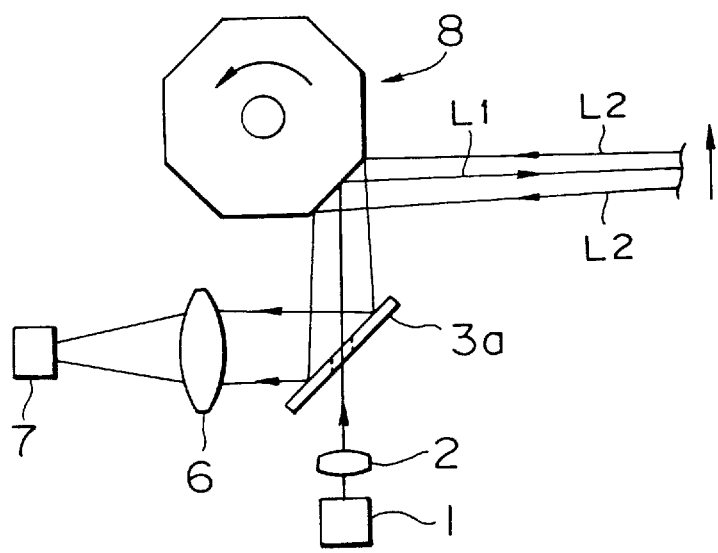
FIG. 14 is a diagram for illustrating the configuration of the conventional device using the polygon mirror.

FIG. 6 is a diagram for illustrating the configuration of the example of the modification of the first embodiment of FIG. 1. This example of the modification realizes the miniaturization of the optical reading device by omitting (or saving) the concave mirror 14 of FIG. 14. Incidentally, like reference characters designate like parts of the first embodiment. Thus, the detailed description of such parts of this example of the modification is omitted herein.

Namely, in the case of this example of the modification, when the semiconductor laser 11 is driven by the laser drive circuit 12 and thus outputs a light beam, the shaping of this light beam is performed by the lens 13. Thus, the spotlight L1 having a small spot diameter is generated. This spotlight L1 is then reflected by the single first reflector element 100 of the reciprocative vibration reflector 15. Subsequently, return light L2 having been irregularly reflected by the medium 16 returns to the reflector element array 101 of the reciprocative vibration reflector 15. Moreover, the return light L2 is reflected thereon. Then, the return light L2 is condensed by a large-diameter lens 17a. Thereafter, the condensed light is received by the photodiode 18. Therefore, in the case of this example of the modification, the concave mirror can be omitted. Moreover, the number of parts or components can be decreased. Consequently, the size and cost of the optical reading device can be reduced.

Next, the second embodiment of the present invention will be described hereunder by referring to FIGS. 7 and 8.

Figure 7:
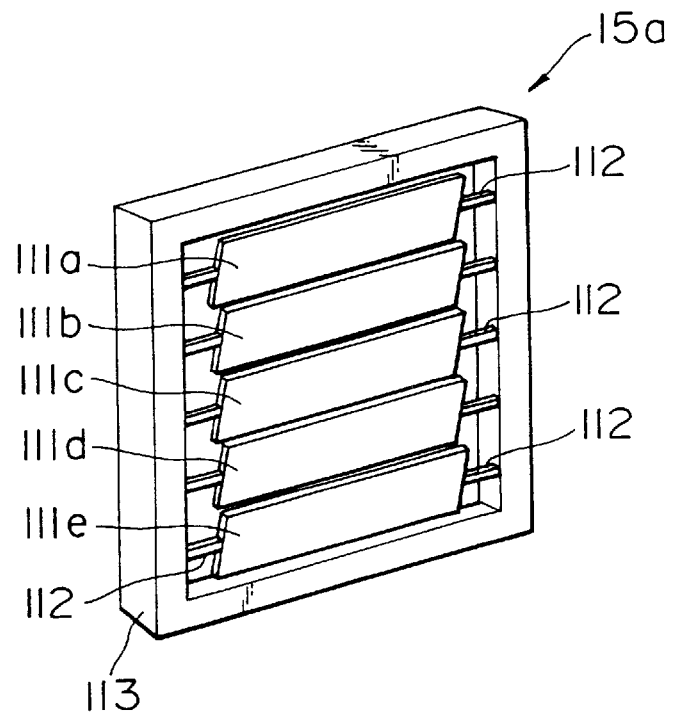
FIG. 7 is an external view of a reciprocative vibration reflector of a second embodiment of the present invention.

FIG. 7 is an external view of the reciprocative vibration reflector 15a of the second embodiment of the present invention. FIG. 8 is a diagram for illustrating the driving principle of the reciprocative vibration reflector 15a of FIG. 7.

In the case of this second embodiment, five reflector elements 111a to 111e are disposed in the scanning direction. The central second reflector element 111c is used as the first reflector element. Further, the first reflector element 111c and the remaining second reflector elements 111a, 111b, 111d and 111e are placed in such a way as to have different reflecting angles so that the second reflector elements 111a, 111b, 111d and 111e do not reflect light having been reflected specularly or regularly by the medium 15, but reflects only light having been reflected irregularly thereon.

Figure 8:
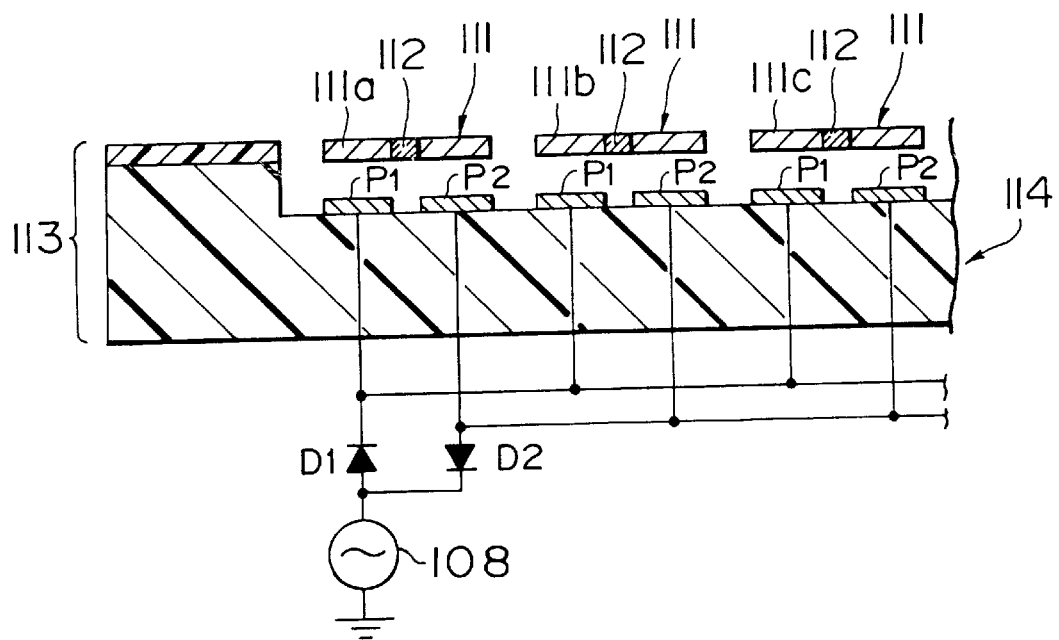
FIG. 8 is a diagram for illustrating the driving principle of the reciprocative vibration reflector of FIG. 7.

Each of the reflector elements 111a to 111e is constituted by an aluminum plate 111 which is provided with a reflecting plate having a mirror finished surface, as illustrated in FIG. 8. Further, each of the reflector elements 111a to 111e is supported on a casing 113 in such a manner that connecting beams (or stringers) 112 cause each of these reflector elements to make reciprocative rotational or pivotal motions. The casing 113 has a silicone plate 114, on the concave bottom surface of which a pair of drive electrodes P1 and P2 are formed in such a manner as to face each of the reflector elements 111a to 111e. The drive electrodes P1 and P2 and the reflector elements 111a to 111e compose air capacitors. In each of the capacitors, only a positive voltage is applied to the drive electrode P1 and on the other hand, merely a negative voltage is applied to the other drive electrode P2 by performing the half-wave rectification of an alternating current supplied from the AC power supply 108 by means of diodes D1 and D2.

At that time, in a first alternation (namely, a first half cycle or 180 degrees) of the alternating current, a charge of the opposite polarity, namely, a negative charge is induced through electrostatic action in a half part (namely, a left-side half, as viewed in this figure) of each of the reflector elements 111a to 111e, which faces the drive electrode P1. Thus, Coulomb's attractive force, whose strength is proportional to the square of the applied voltage, is generated. Further, in the first alternation of the alternating current, the voltage applied to the other drive electrode P2 is "0". Thus, substantially no Coulomb's attractive forces are generated in the other side part (namely, the right-side half part, as viewed in this figure) of each of the reflector elements 111a to 111e, which faces the drive electrode P2. Therefore, each of the reflector elements 111a to 111e pivotally moves (or rotates) counterclockwise by twisting a corresponding one of the connecting beams 112, and is inclined toward the corresponding one of the connecting beams 112. Furthermore, at the end of this first alteration, Coulomb's attractive forces vanish from both of these parts. Consequently, the reflector elements 111a to 111e are returned to horizontal positions by the torsional reactive forces of the connecting beams 112.

Moreover, conversely, in a second alternation (namely, a second half cycle or 180 degrees) of the alternating current, almost no Coulomb's attractive forces are generated in a half part (namely, the left-side half part, as viewed in this figure) of each of the reflector elements 111a to 111e, which faces the drive electrode P1. Further, Coulomb's attractive forces are generated in the other side part (namely, the right-side half part, as viewed in this figure) of each of the reflector elements 111a to 111e, which faces the drive electrode P2. Furthermore, each of the reflector elements 111a to 111e pivotally moves (or rotates) clockwise by twisting a corresponding one of the connecting beams 112, and is inclined toward the corresponding one of the connecting beams 112. Thus, in the cycles of the alternating current, the reflector elements 111a to 111e make reciprocating pivotal motions, respectively.

Even in the case of this second embodiment, similarly as in the case of the first embodiment, an angular difference between the optical axes of the irradiated light and the received light is produced by causing a phase difference between the drive signal for the first reflector element 111c and each of the drive signal respectively used for driving the second reflector elements 111a, 111b, 111e and 111e. Thus, places, at which the light irradiating element and the light receiving element are mounted, are shifted from the optical axes or paths of the irradiated light and the received light, respectively. Consequently, a simple configuration with ease of fabrication can be realized without utilizing a special optical element (for example, an apertured mirror) and adding optical elements, such as a mirror and a prism, for separating irradiated light (or emitted light) from received light.

In the case of this second embodiment, the first reflector element 111c and the second reflector elements 111a, 111b, 111d and 111e are pivotally moved (or rotated) in the reciprocating direction by magnetic force and Coulomb's force caused by using the AC power supply. Consequently, the configuration of a drive system can be simplified in comparison with those of the drive systems of the conventional devices which use a galvanomirror and a polygon mirror.

Incidentally, if the drive electrodes P1 and P2, which face the first reflector element 111c, are formed only by being inclined at an angle instead of driving the reflector elements as illustrated in FIG. 5, the drive circuits respectively corresponding to the five reflector elements 111a to 111e can be formed in such a manner as to have a same configuration. Additionally, this method can be applied to the first embodiment.

Next, the third embodiment of the present invention will be described hereinbelow by referring to FIG. 9.

Figure 9:
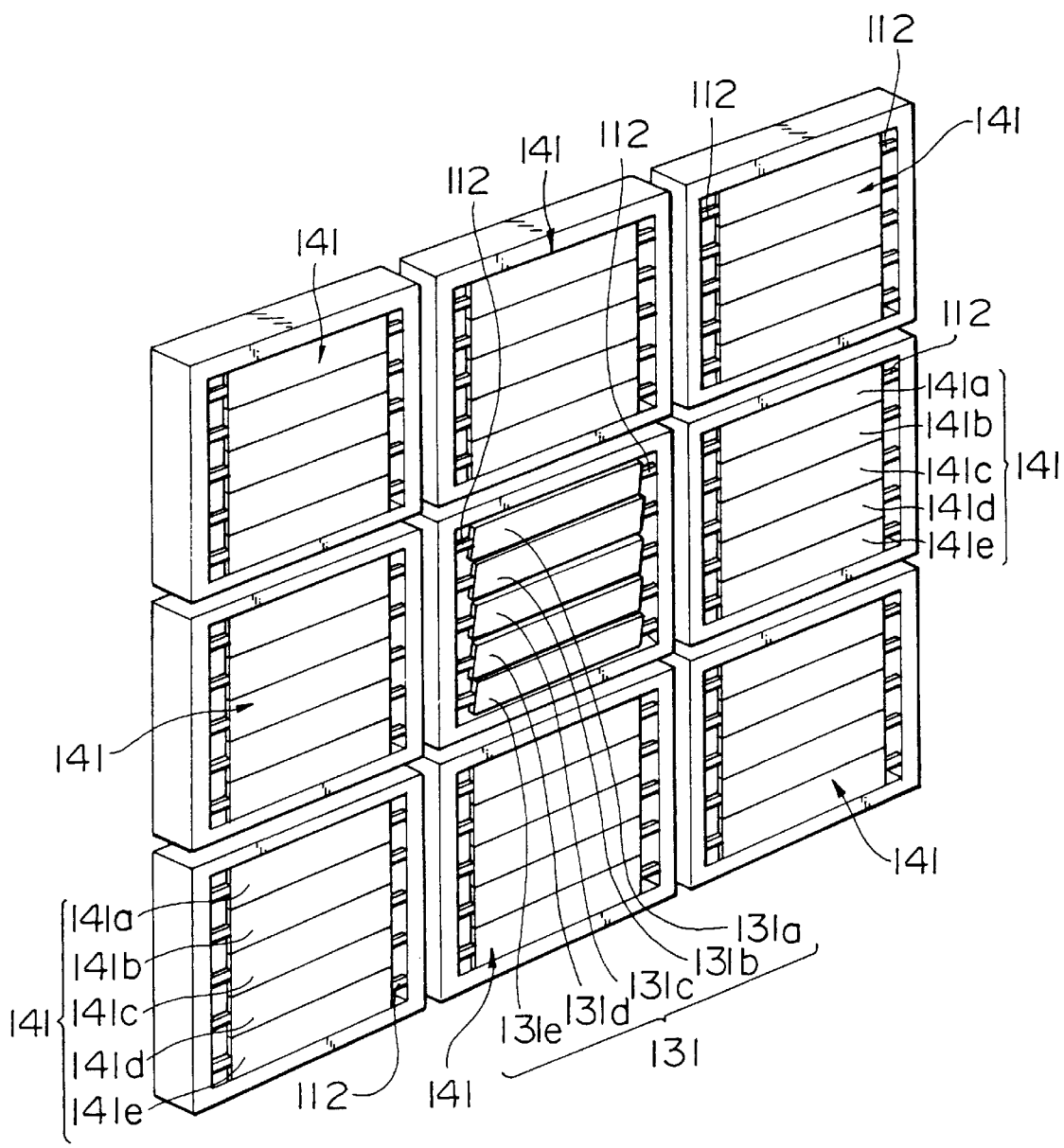
FIG. 9 is an external view of a third embodiment of the present invention.

FIG. 9 is an external view of the third embodiment of the present invention.

In the case of the third embodiment, five first reflector elements 131a to 131e are formed by performing the etching of a metal film in such a way as to be arranged in the scanning direction. Further, these reflector elements are used as a first reflector element cell 131. Incidentally, reference numeral 112 designates shafts of torsional vibration, which are formed at both ends of each of the reflector elements 131a to 131e, respectively, in such a way as to be integral therewith, for supporting these reflector elements.

Moreover, five second reflector elements 141a to 141e are arranged in the scanning direction and are used as a second reflector element cell 141. Further, reference numeral 112 designates shafts of torsional vibration, which are formed at both ends of each of the reflector elements 141a to 141e, respectively, in such a way as to be integral therewith, for supporting these reflector elements. Furthermore, a reflector element cell tray is configured by placing a plurality of second reflector element cells 141 around the first reflector element cell 131 in a same plane. Additionally, each of the first reflector elements 131a to 131e of the first reflector element cell is placed on the corresponding shaft by being inclined at an angle to the plane, which is different from an angle at which each of the second reflector elements 141a to 141e of the second reflector element cell 141 is inclined to the same plane, in such a way that light reflected specularly from the medium 5 is not reflected by the cell tray, whereas only light reflected irregularly by the medium 5 is reflected by the cell tray.

Each of the reflector elements 131a to 131e and 141a to 141e is composed of an aluminum plate 111 having a mirror finished surface, similarly as in the case of the embodiment of FIG. 8. Further, each of the reflector elements 131a to 131e and 141a to 141e is supported by the corresponding connecting beams 112 in the casing 113 in such a manner that the corresponding connecting beams 112 cause each of these reflector elements to make pivotal reciprocating motions. The casing 113 has a silicone plate 114, on the concave bottom surface of which a pair of drive electrodes P1 and P2 are formed in such a manner as to face each of the reflector elements 131a to 131e and 141a to 141e. The drive electrodes P1 and P2 and these reflector elements constitute air capacitors.

The third embodiment constructed as above described is provided with the light source 11 for irradiating a light beam, the first reflector element cell 131 consisting of the plurality of the first reflector elements 131a to 131e, adapted to pivotally move (or rotate) in a reciprocating direction corresponding to a scanning direction, for reflecting the light beam in such a manner that an object to be read is irradiated with the light beam and a reflector element cell array composed of a plurality of second reflector element cells 141, . . . , each consisting of a plurality of second reflector elements 141a to 141e, which are adapted to pivotally move (or rotate) in a reciprocating direction corresponding to the scanning direction, for reflecting return light irregularly reflected by the object. Further, in the third embodiment, the first reflector element cell 131 and the reflector element cell array are placed in a plane. Therefore, the structure of the reciprocative vibrating body 15 can be regarded as being effectively fixed. Further, the inertia of the reciprocating vibration of each of the reflector elements 131a to 131e and 141a to 141e becomes negligible. Thus, the ultra-high-speed scanning can be easily achieved. Moreover, the rise time of the device, namely, a time required to activate the device having been in the stopped state thereof can be neglected. Furthermore, the reading speed thereof can be prevented from being reduced even in the case of an optical reading device of the hand-held type that frequently repeats stopping and scanning operations in order to reduce the power consumption thereof. Additionally, the area of the entire reflector can be easily increased by increasing the number of reflector element cells 141. Thus, the quantity of light obtained by condensing the returned and reflected light. Moreover, the mechanical vibration thereof becomes negligible. The reliability thereof can be considerably enhanced. Furthermore, the device becomes easy to use without causing a feeling of vibrating in a hand of a user thereof even when used as an optical reading device of the hand-held type.

Next, the fourth embodiment of the present invention will be described hereinbelow by referring to FIGS. 10 to 12.

Figure 10:
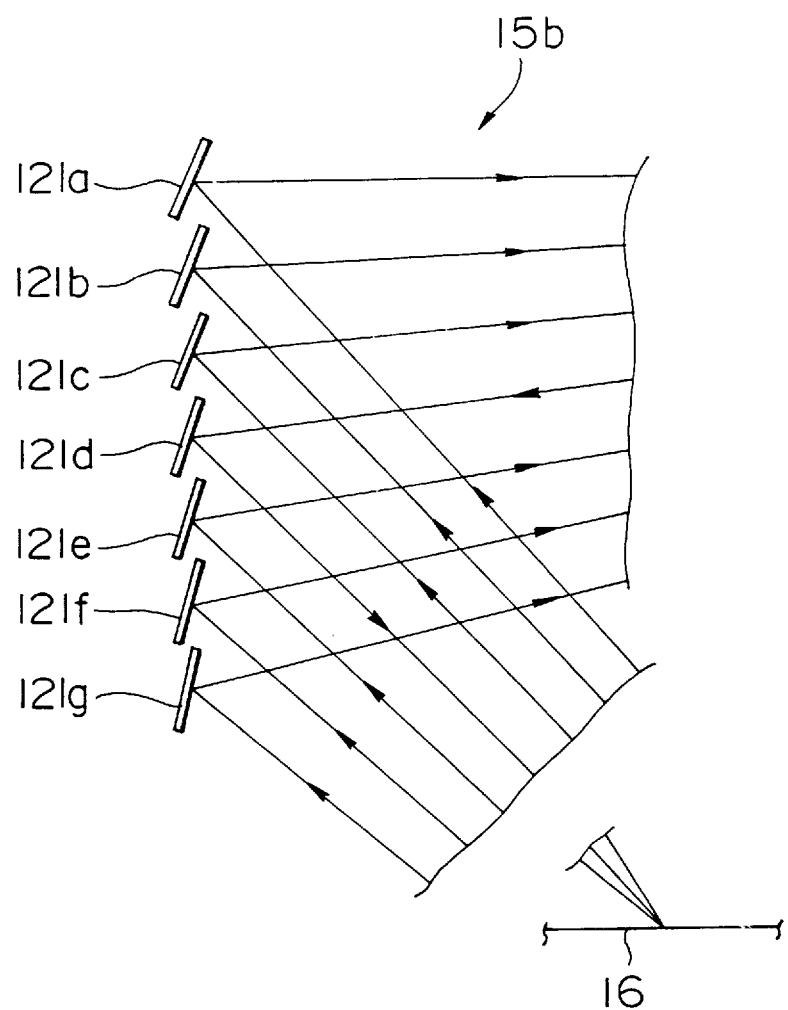
FIG. 10 is a side view of a reciprocative vibration reflector of a fourth embodiment of the present invention.

FIG. 10 is a side view of a reciprocative vibration reflector of the fourth embodiment of the present invention. FIG. 11 is a diagram for illustrating the driving principle of the reciprocative vibration reflector of FIG. 10. FIG. 12 is a circuit diagram for illustrating a primary part of a reflector drive circuit of FIG. 11.

This reciprocative vibration reflector 15b is composed of seven reflector element arrays 121a to 121g. Further, the central reflector element array 121d is used as a reflector element array. Furthermore, in the case of this fourth embodiment, reference angles of the second reflector element arrays 121a to 121g (namely, angles of inclination of these reflector element arrays when no drive signals are applied thereto) are sequentially caused to become different (or changed) by a predetermined angle in a scanning direction in such a manner that a total reflecting surface extending in the scanning direction becomes a nearly concave mirror as illustrated in FIG. 11.

Figure 11:
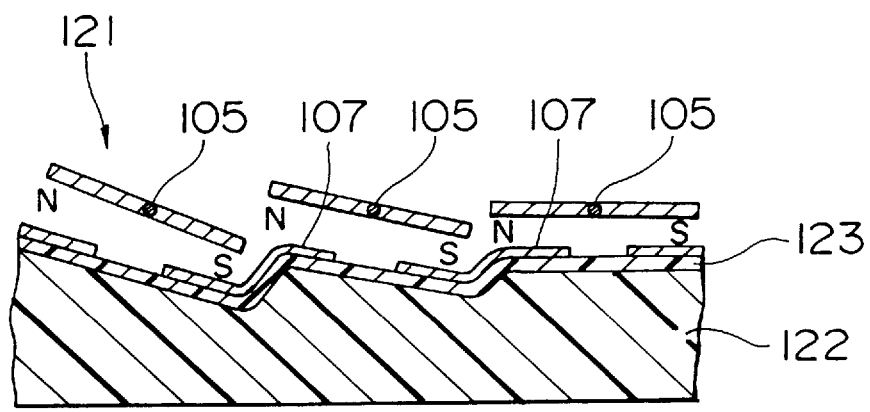
FIG. 11 is a diagram for illustrating the driving principle of the reciprocative vibration reflector of FIG. 10.
Figure 12:
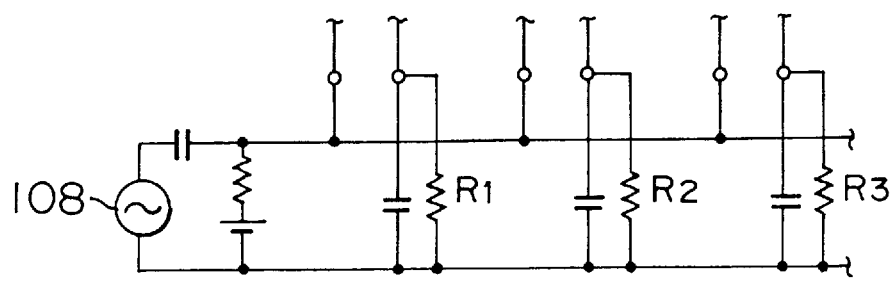
FIG. 12 is a circuit diagram for illustrating a primary part of a reflector drive circuit of FIG. 11.
Figure 13:
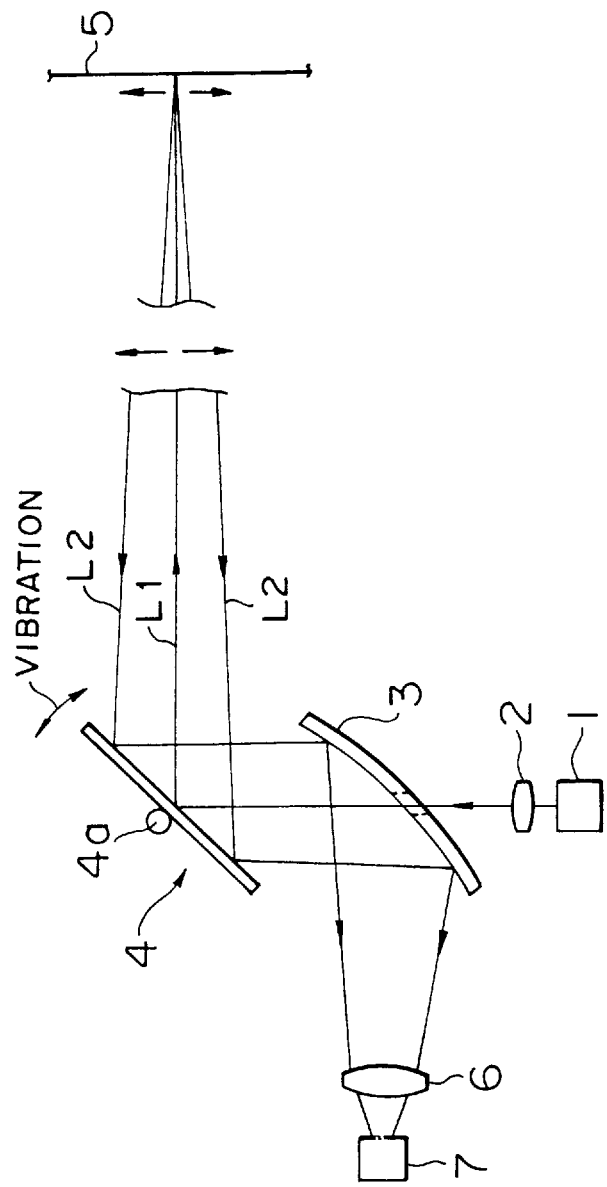
FIG. 13 is a diagram for illustrating the configuration of the conventional device using the galvanomirror.

In this case, each of the reflector element arrays 121a to 121g is constituted by a layered product (namely, a laminate body) having a reflecting surface 103 and a magnetic film 104 similarly as in the case of FIG. 3 (not shown in FIG. 11). Further, each of the element arrays 121a to 121g is supported in such a way as to be able to make clockwise and anti-clockwise reciprocating pivotal motions (or vibrations) around the shaft 105 of vibration serving as a central axis. Moreover, as illustrated in, for example, FIG. 11, a surface of a molded circuit board 122 is formed in such a manner that angles of inclination of portions thereof facing the reflector element arrays 121a to 121g are different from one another. As illustrated in FIG. 4, a flexible board 123, on which a thin film coil 107 is formed in such a manner as to face the magnet film 104 as illustrated in FIG. 4, is stacked on the surface of the molded circuit board 122 as a layer.

With such a configuration, the reflector element arrays 121a to 121g are caused by the AC power supply 108 to perform reciprocal pivotal motions, similarly as in the case of the first embodiment. Moreover, direct-current (DC) bias currents are regulated by resistances R1, R2, R3, . . . in such a manner that the reference angles of the reflector element arrays 121a to 121g are sequentially caused to become different (or changed) by a predetermined angle. Furthermore, similarly as in the case of the aforementioned embodiment, the central reflector element array 121d serving as the first reflector element array may be made to be different in angle of reflection from the other reflector element arrays 121a to 121c and 121e to 121g. In such a case, the reflector element arrays 121a to 121c and 121e to 121g are controlled in such a manner that even when these reflector element arrays make reciprocating motions, the total reflecting surface (composed of the reflector element arrays) becomes a concave mirror surface.

In the case of applying such a configuration to the device of FIG. 6, the total reflecting surface in the scanning direction of the reflector element arrays 121a to 121g becomes a concave mirror surface. Thus a small-diameter lens can be used as the collective lens 17a. Consequently, such a device becomes preferable as the optical reading device of the hand-held type.

Although the preferred embodiments of the present invention have been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. An optical reading device comprising:
   a light source for radiating a light beam;
   a first reflector element cell consisting of a plurality of first reflector elements, adapted to pivotally move in a reciprocating direction corresponding to a scanning direction, for reflecting the light beam in such a manner that an object to be read is irradiated with the light beam; and
   a reflector element cell array composed of a plurality of second reflector element cells each comprising a plurality of second reflector elements, which are adapted to pivotally move in a reciprocating direction corresponding to the scanning direction, for reflecting return light irregularly reflected by the object.

2. The optical reading device according to claim 1, wherein an angle of reflection of the first reflector element cell is different from an angle of the second reflector element cells.

3. The optical reading device according to claim 1, wherein reference angles of the second reflector elements are sequentially caused to become different by a predetermined angle in a scanning direction in such a manner that a total reflecting surface extending in the scanning direction becomes a nearly concave mirror.

4. The optical reading device according to claim 1 wherein the first and second reflector elements are pivotally moved in a reciprocating direction by a magnet force caused by using an alternating current power supply.

5. The optical reading device according to claim 1 wherein the first and second reflector elements are pivotally moved in a reciprocating direction by Coulomb's force caused by using an alternating current power supply.

* * * * *